May 4, 1937.  G. R. GALLAGHER ET AL  2,079,501
ANTISKID DEVICE
Filed Oct. 19, 1935  2 Sheets-Sheet 1
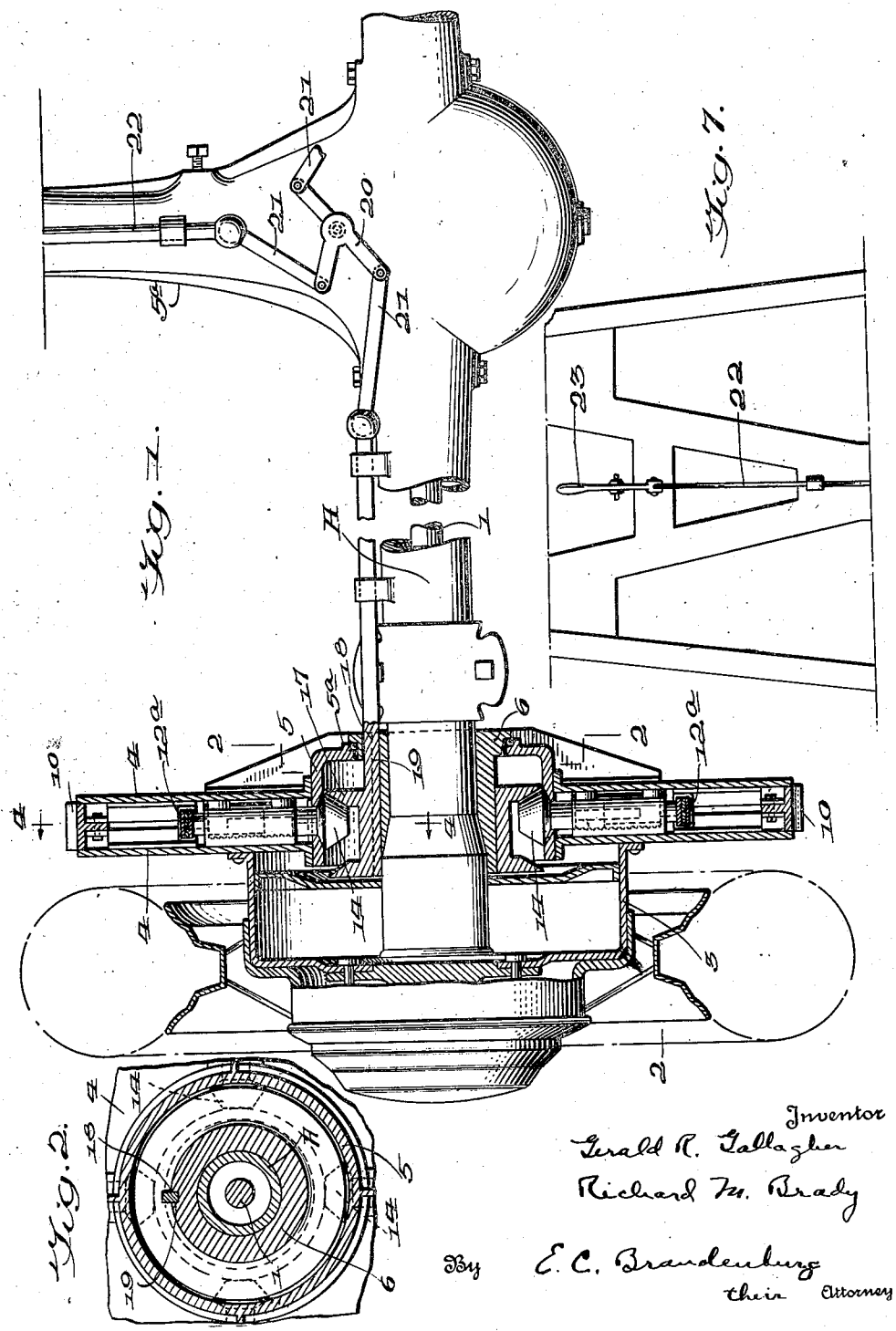
Inventor
Gerald R. Gallagher
Richard M. Brady
By E. C. Brandenburg
their Attorney

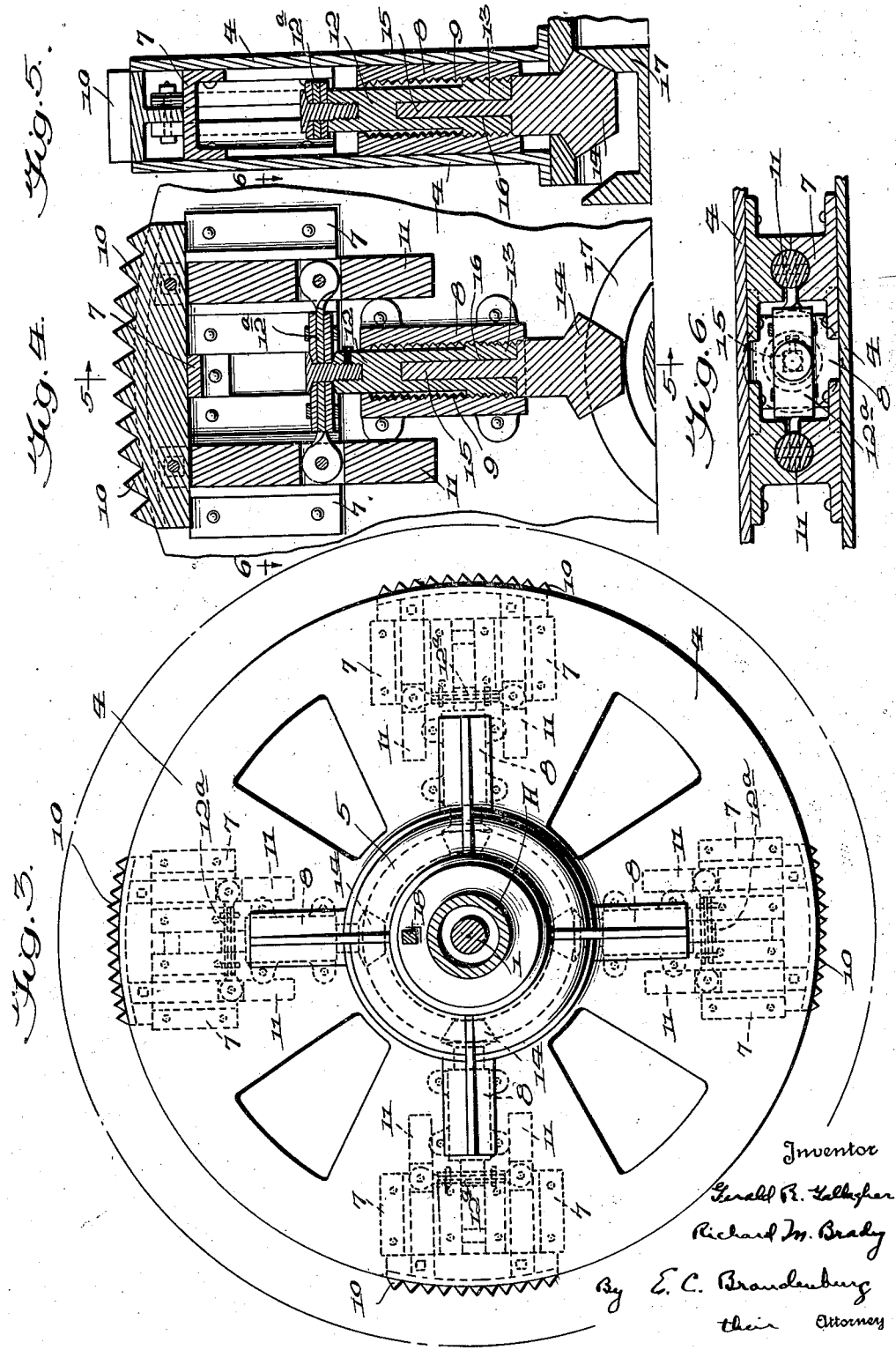

Patented May 4, 1937

2,079,501

UNITED STATES PATENT OFFICE 2,079,501

ANTISKID DEVICE

Gerald R. Gallagher and Richard M. Brady, Easton, Pa.

Application October 19, 1935, Serial No. 45,808

5 Claims. (Cl. 301—47)

Our invention relates to an improvement in antiskid devices.

The disadvantage of tire chains which this invention would replace are numerous and well-known. Briefly, it may be said chains are clumsy, difficult and inconvenient to apply, hence the operator usually delays applying them as long as possible which circumstance always creates a hazard both to driver and others. Once applied, the corresponding inconvenience deters the motor car operator from removing the chains when not needed in a safe area with resultant wear on the chains, discomfort in riding, and unnecessary wear and tear on the tires, pavements and roads.

Our improved antiskid device, by eliminating these conditions, recommends itself from the standpoint of safety, convenience, economy and increased comfort, not to speak of a degree of additional confidence in the occupants of the vehicle.

Our present invention is simple, accurate, applicable to any make of car, and may become standard equipment or an accessory. It is controlled by a small hand-lever at the driver's seat. To project or withdraw the treads, the car must be moving at a speed of ten miles per hour or less, and if the car is moving forward, the driver pushes this lever to a position marked "In" or "Out", according to the necessities of the moment. When the car is moving backward, he reverses these motions, that is to say if he wishes the treads in, he pushes the levers to the "out" position, or vice versa. When the lever is shifted, it moves a rod which has connections to both rear wheels, and when these rods move, they operate two friction cones of opposite inclination on a double friction spool which moves to engage or become disengaged from the friction cones on the shafts of the antiskid units on each wheel. The action is always within the control of the operator. The device does not easily get out of order, and it is quick-acting and dependable at all times.

In the accompanying drawings:

Fig. 1 is a plan view with parts broken away and partly in horizontal section;

Fig. 2 is a transverse section on the line 2—2 of Fig. 1;

Fig. 3 is a view from the inside of the wheel shown in Fig. 1 and looking toward the left showing the axle and axle housing in cross-section;

Fig. 4 is an enlarged sectional view on line 4—4 of Fig. 1;

Fig. 5 is a transverse section on line 5—5 of Fig. 4;

Fig. 6 is a horizontal section on line 6—6 of Fig. 4; and

Fig. 7 is a diagrammatic fragmentary view merely to show the operating lever.

A, represents the usual axle housing, and 1, is the axle with the usual wheel 2 on the outer end. The wheel has the usual brake-drum 3 to which the brake (not shown) is applied.

A tread housing 4 (see Figs. 3 to 6) in the form of two circular plates is secured at the center in any approved manner to the brake-drum 3 and to the hub 5, and this hub turns on ball-bearings 5a between the inner end of the hub and the sleeve 6, which latter is fastened to the axle housing A.

The circular plates 4 are held apart by spacing blocks 7 and sleeves 8 which latter are provided with internal screw-threads 9, as illustrated in Figs. 4 and 5.

The treads 10, preferably four in number, and equidistant, are radially movable with respect to the spacing blocks 7 by means of the guide rods 11, as illustrated in Figs. 4 and 6. These rods 11 are each connected to a screw 12 by means of a leaf-spring 12—A, and each screw 12 has threads 13 which fit and turn in the internal threads 9 of the sleeve 8, as viewed in Figs. 4 and 5.

Friction cones 14 have angular stems 15 which fit and have slidable telescopic connection with correspondingly shaped orifices 16 in the screws 13, so that when the friction cones 14 are turned they impart a rotary motion to the sleeves 13, with the result that the latter are fed inwardly or outwardly in order to bring the treads in contact with the surface of the road or to remove them therefrom, as the case may be, and as will be hereinafter explained.

In order to actuate the treads, a double friction spool 17 is slidably connected with the sleeve 6 of the hub 5 through the medium of a stem 18 in the keyway 19 formed transversely in the sleeve 6, as shown in Figs. 1 and 2. The friction cones 14 are located in the annular space formed by the double friction spool 17 as clearly shown in Figs. 1, 4 and 5, and the annular space is sufficiently greater than the diameter of the cones to permit of a neutral position, but when one side of the double friction spool engages these cones, the treads 10 are projected outward through the action of the screw-threads 9 and 13 and the sliding connection of the stem 15 with the screw 12.

The double friction spool 17 is shifted back and forth by means of lever 20, links 21, and rods 22 extending to the hand-lever 23, which latter extends to a point within reach of the driver.

The leaf-springs 12—A will absorb the impact of the treads against the pavement as well as serve to lock the treads either in the "in" or "out" position.

The tread guide rods 11 are designed to take the pressure on the loosely jointed tread frame.

In operation, the device is controlled by the small hand-lever 23 at the driver's seat. To extend or withdraw the treads 10, the car must be moving at a speed of ten miles per hour or less. If the car is moving forward, the driver pushes the lever to one extreme position or the other, according to the requirements. When the car is moving backward, the operation is just the reverse, that is to say, if the operator wishes the treads in, he pushes the lever to the "out" position or vice versa. When the lever 23 is moved, it moves the rod 22 and through it and the links 21 and lever 20 it exerts endwise movement on the stem 18 of the double friction spool 17, thus creating a contact with the friction cones 14 from either one side or the other of the four anti-skid units on each rear wheel.

The entire device on each wheel is built up integral with the wheel itself, as has been pointed out. As the wheels of the car rotate, if the treads are to be moved in or out, the friction cones 14 engage one or the other side of the double friction spool 17, which latter is stationary, and in this manner the screws 12 are caused to rotate, and, by means of this rotation of the screws 12, the thrusting out or pulling in of the anti-skid treads 10 is controlled through the leaf springs 12—A.

When the anti-skid treads are entirely out or in, they come in contact with a stop. This can be felt or judged by the driver, whereupon he puts his control lever in neutral, that is to say he shifts the double friction spool so that the cones 14 are in an intermediate position and out of frictional contact therewith.

The structure is not subject to any great misuse, as the quality of friction would be such that it would serve only to turn the shafts when there was no unusual resistance.

We claim:

1. The combination of an axle housing, an axle, a wheel secured to the axle, a tread housing comprising two circular plates spaced apart and secured together and connected with the wheel, treads having guide rods connected therewith and slidably connected with the housing, friction means, means connected to the friction means and having telescopic connection with the guide rods, a double friction spool for applying friction in either direction to the friction means, and means for shifting this spool to various positions.

2. The combination of an axle housing, an axle, a wheel secured to the axle, a tread housing comprising two circular plates spaced apart and secured together and connected with the wheel, treads having guide rods connected therewith and slidably connected with the housing, friction means, means connected to the friction means and having telescopic and spring connection with the guide rods, a double friction spool for applying friction in either direction to the friction means, and means for shifting this spool to various positions.

3. The combination of an axle housing, an axle, a wheel connected with the axle, a channeled double friction spool slidably connected with the axle housing, a tread housing including two plates spaced apart and secured to the brake-drum of the wheel, treads having guide-rods slidably mounted between the plates of the tread housing, rotatably mounted friction cones located in the channel formed by the double friction spool, a screw connected with each cone, a leaf-spring connecting the screws with the tread guides, the screws having a non-rotatable but sliding connection with the friction cones, whereby, when the latter are turned, the tread is moved radially in one direction or the other.

4. The combination of an axle housing, an axle, a wheel secured to the axle, a tread housing connected with the wheel, treads having guide-rods slidably connected with the tread housing, extensible devices, springs connecting the latter with the guide-rods at one end, the extensible devices having friction means at the opposite ends, a channeled double friction spool within the channel of which the friction devices extend, and means for shifting the spool with respect to the friction devices.

5. The combination of an axle housing, an axle, a wheel connected with the axle and having a brake-drum, a channeled double friction spool slidably connected with the axle housing, means within the control of the operator for shifting said spool, a tread housing secured to the brake drum of the wheel, treads having guide rods slidably connected with the tread housing, rotatably mounted friction devices located in the channel formed by the double friction spool, extensible means interposed between and connected with the guide rods and the friction devices, whereby when the latter turn, the treads are moved radially in one direction or the other.

GERALD R. GALLAGHER.
RICHARD M. BRADY.